United States Patent
Honey et al.

(10) Patent No.: US 6,466,275 B1
(45) Date of Patent: Oct. 15, 2002

(54) ENHANCING A VIDEO OF AN EVENT AT A REMOTE LOCATION USING DATA ACQUIRED AT THE EVENT

(75) Inventors: Stanley K. Honey, Palo Alto, CA (US); Richard H. Cavallaro, Mountain View, CA (US); Jerry N. Gepner, Langhorn, PA (US); James R. Gloudemans, San Mateo, CA (US); Marvin S. White, San Carlos, CA (US)

(73) Assignee: Sportvision, Inc., New York, NY (US)

( * ) Notice: Subject to any disclaimer, the term of this patent is extended or adjusted under 35 U.S.C. 154(b) by 0 days.

(21) Appl. No.: 09/293,378

(22) Filed: Apr. 16, 1999

(51) Int. Cl.[7] ............................................. H04N 5/222

(52) U.S. Cl. ..................... 348/722; 348/157; 348/578; 348/589; 348/600

(58) Field of Search .................. 348/578, 722, 348/460, 473, 474, 434, 435, 433, 159, 153, 154, 155, 157, 563, 518, 12

(56) References Cited

U.S. PATENT DOCUMENTS

| | | | |
|---|---|---|---|
| 3,580,993 A | 5/1971 | Sandorf et al. | 178/6 |
| 3,840,699 A | 10/1974 | Bowerman | 178/6.8 |
| 4,084,184 A | 4/1978 | Crain | 358/93 |
| 4,521,196 A | 6/1985 | Briard et al. | 434/20 |
| 4,591,897 A | 5/1986 | Edelson | 358/22 |
| 4,700,306 A | 10/1987 | Wallmander | 364/449 |
| 4,739,406 A | 4/1988 | Morton et al. | 358/183 |
| 4,975,770 A | 12/1990 | Troxell | 358/96 |
| 4,999,709 A | 3/1991 | Yamazaki et al. | 358/160 |
| 5,063,603 A | 11/1991 | Burt | 382/37 |
| 5,179,421 A | 1/1993 | Parker et al. | 356/152 |

(List continued on next page.)

FOREIGN PATENT DOCUMENTS

| | | |
|---|---|---|
| CA | 2106336 | 9/1993 |
| DE | 41 01 156 A1 | 1/1991 |
| DE | 4222679 A | 1/1994 |
| GB | 2191361 A | 9/1987 |
| SU | 1659078 A1 | 12/1988 |
| WO | WO 95/10915 | 4/1995 |
| WO | WO 95/10919 | 4/1995 |

OTHER PUBLICATIONS

Replay 2000—The Ultimate Workstation for Sport Commentators and Producers, Orad Hi–Tec Systems, Apr. 1995.
SailTrack, GPS Tracking System for Animated Graphics Broadcast Coverage of the America's Cup Races, 1992.
SailTrack Technical Overview, 1992.
Sail Viz Software Documentation, 1992.
SailTrack–cc of computer screen.
SailTrack–excerpts of Source Code.
For Hockey Fans The Puck Starts Here, The Time Inc. Magazine Company, Sports Illustrated, p. 14, Oct. 8, 1990.
TES3, Multistandard TV Data Encoding Platform, Norpak Corporation, www.norpak.ca/Tes3.htm, Dec. 29, 1998.

Primary Examiner—John Miller
Assistant Examiner—Trang U. Tran
(74) Attorney, Agent, or Firm—Vierra Magen Marcus Harmon & DeNiro LLP (57) ABSTRACT

A system is disclosed that can be used to enhance a video of an event. Sensors are used at the event to acquire information. For example, the system can include pan, tilt and zoom sensors to acquire camera view information. This information can be added to the video signal from a camera (e.g. in the vertical blanking interval) or otherwise transmitted to a central studio. At the studio, the sensor information is used to enhance the video for broadcast. Example enhancements include drawing lines or other shapes in the video, adding advertisements to the video or adding other graphics to the video.

37 Claims, 6 Drawing Sheets

U.S. PATENT DOCUMENTS

| | | | |
|---|---|---|---|
| 5,229,850 A | * 7/1993 | Toyoshima | 348/153 |
| 5,264,933 A | 11/1993 | Rosser et al. | 358/183 |
| 5,353,392 A | 10/1994 | Luquet et al. | 395/135 |
| 5,392,088 A | 2/1995 | Abe et al. | 354/402 |
| 5,413,345 A | 5/1995 | Nauck | 273/185 R |
| 5,414,439 A | 5/1995 | Groves et al. | 345/7 |
| 5,450,140 A | * 9/1995 | Washino | 348/722 |
| 5,465,144 A | 11/1995 | Parker et al. | 356/139.06 |
| 5,469,536 A | 11/1995 | Blank | 395/131 |
| 5,479,597 A | 12/1995 | Fellous | 395/154 |
| 5,488,409 A | * 1/1996 | Yuen et al. | 386/83 |
| 5,491,517 A | * 2/1996 | Kreitman et al. | 348/722 |
| 5,508,737 A | 4/1996 | Lang | 348/159 |
| 5,513,103 A | 4/1996 | Charlson | 364/411 |
| 5,513,854 A | 5/1996 | Daver | 273/454 |
| 5,543,856 A | 8/1996 | Rosser et al. | 348/578 |
| 5,559,496 A | 9/1996 | Dubats | 340/539 |
| 5,566,251 A | 10/1996 | Hanna et al. | 382/284 |
| 5,570,295 A | 10/1996 | Isenberg et al. | 364/514 R |
| 5,677,532 A | 10/1997 | Duncan et al. | 250/339.15 |
| 5,745,167 A | * 4/1998 | Kageyu et al. | 348/153 |
| 5,764,275 A | * 6/1998 | Lappington et al. | 348/12 |
| 5,818,441 A | 10/1998 | Throckkmorton et al. | 345/328 |
| 5,825,432 A | * 10/1998 | Yonezawa | 348/563 |
| 5,857,190 A | 1/1999 | Brown | 707/10 |
| 5,889,550 A | * 3/1999 | Reynolds | 348/722 |
| 6,005,633 A | * 12/1999 | Kosugi | 348/518 |
| 6,034,740 A | * 3/2000 | Mitsui et al. | 348/722 |
| 6,069,655 A | * 5/2000 | Seeley et al. | 348/154 |
| 6,609,655 | 5/2000 | Seeley et al. | 348/154 |
| 6,154,250 A | 11/2000 | Honey et al. | 348/157 |

\* cited by examiner

ENHANCING A VIDEO OF AN EVENT AT A REMOTE LOCATION USING DATA ACQUIRED AT THE EVENT

BACKGROUND OF THE INVENTION

1. Field of the Invention

The present invention is directed to a system for enhancing a video of an event using data acquired at the event.

2. Description of the Related Art

The remarkable, often astonishing, physical skills and feats of great athletes draw millions of people every day to follow sports that range from the power of American football to the grace of figure skating, from the speed of ice hockey to the precision of golf. Sports fans are captivated by the abilities of basketball players to soar to the rafters, a baseball batter to drive the ball out of the park, a runner to explode down the track, a skier to race down the hill, a running back to break through the pack and make the first down, etc. In televising these events, broadcasters have developed a wide repertoire of technologies—ranging from slow-motion replay to lipstick-sized cameras mounted on helmets—to highlight for viewers these exciting events. Other examples of technologies used by the broadcasters include highlighting moving objects, showing locations on a playing field that are of interest to the viewer (e.g. a first down line), displaying new statistics and adding virtual advertisements to the video.

Many of the technologies employed by broadcasters to add various graphics and other information to the television presentation of the event use large amounts of equipment at the event. In some cases, a truck is needed to transport the equipment and to serve as a production center for the graphical effect. Typically, such trucks include expensive video equipment and computers. After the event is over, all of the equipment is loaded on the truck and the truck is transported to the next event. While the above-described arrangement has been successful in providing various graphical effects, such an arrangement has its drawbacks because the equipment is very expensive and the systems do not make cost efficient use of the equipment.

For example, a full set of equipment is needed for every single event that is televised on the same day. Thus, if a broadcaster was televising four football games on the same day (but, possibly, at different times or in different regions), four sets of equipment would be needed. Purchasing four sets of equipment can be very expensive for a broadcaster and the trucks to house/transport the equipment are expensive. Additionally, a broadcaster may not have four sets of equipment available.

Furthermore, events tend to be located at various locations throughout a geographic region. After a television presentation of a game is completed, the truck must be transported to the next location. During transport, the equipment is not available for use by the broadcaster. Additionally, repeatedly transporting the equipment adds to the maintenance costs of the equipment.

In sum, broadcasters spend large amounts of money for equipment that is not available at all times and has high maintenance costs. Therefore, a system is needed that can be used to enhance the video presentation of an event and that makes more efficient use of the equipment necessary for the enhancements.

SUMMARY OF THE INVENTION

The present invention, roughly described, provides for a system to enhance a video or audio presentation of an event using data acquired at the event. Rather than locate all of the necessary equipment at the event, the system is broken up into at least two groups of equipment. The first group of equipment is located at the event. This first group of equipment measures the data needed for the enhancement. The second group of equipment is located at a studio location remote from the event. The second group of equipment is used to create the actual enhancement. The enhancement can be made to video or audio. In one alternative, the first group of equipment is designed to be a small set of equipment so that it could be easily transported from event to event.

In one embodiment, the present invention includes one or more data sensors located at the event, means for transmitting data from the data sensors to a location remote from the event, and one or more processors at the location remote from event. In one alternative, the one or more processors are programmed to perform the steps of determining a position of a target in the video and enhancing the video based on the step of determining. Various data sensors can be used. In one example, the data sensor is a camera view sensor which senses information about the view of a camera. Examples of a camera view sensor include a pan sensor, a tilt sensor, a zoom sensor, a roll sensor, a focus sensor and/or a 2X extender sensor.

In some alternatives, there may be many cameras at an event. Each camera could include its own camera view sensor(s). The data from the various camera view sensors may be communicated to a data concentrator. In one embodiment, the data concentrator can also receive an indication of which camera is tallied. The system can include a tally detector which automatically determines which camera is tallied. The information from the data concentrator and the program video are transmitted to the remote location. In one embodiment, the data from the data concentrator is added to the vertical blanking interval of the program video. Alternatives, include adding the data to a digital video signal, or transmitting the data via telephone line, cable modem, satellite, dedicated communication line, etc.

In one embodiment, the invention includes the step of sensing position data during the event. The position data is transmitted from the event to the location remote from the event. The position of the target area in the video is determined using the position data. The video is enhanced based on the step of determining a position in the video. If the data sensors are camera view sensors, then the position data would include camera view data. The data can also include a tally indication, a time code and/or registration information. In one alternative, the system can match time codes with the camera view data so that processing at the remote location can be performed by matching the appropriate camera view data to the appropriate frame or field of video using time codes. For some embodiments, the video includes interlaced fields such that an odd field and an even field comprise a frame. Other video formats (e.g. digital video) can be used with the present invention.

In another embodiment, the present invention includes the steps of selecting a target area in a first video image of the event, sensing camera view data for a plurality of cameras during the event and receiving time codes. The time codes are associated with the appropriate camera view data. The time codes and appropriate camera view data are transmitted to a location remote from the event. The system also receives a live video of the event. The live video includes an image of the target area. The system determines the target area's position in the live video using at least one of the time codes and the camera view data corresponding to the time code. The system enhances the live video based on the target area's position in the live video.

These and other objects and advantages of the invention will appear more clearly from the following detailed description in which the preferred embodiment of the invention has been set forth in conjunction with the drawings.

DETAILED DESCRIPTION

The present invention can be used to enhance a video presentation of a sporting event or a nonsporting event. One exemplar enhancement is the blending of a graphic with a video. Video means an analog or digital signal depicting (or used to produce) moving images. Blending means combining at least a first image or video with at least second image or video such that the result includes all or part of the first image or video and all or part of the second image or video. One example of how images are blended includes using a keyer to key one image over another. Examples of graphics that can be blended to the video presentation of an event include adding a first down line or other marker to a video of a football game, adding handwritten annotations to the video presentation of a sporting event, or adding logos to a video presentation of an event. A logo can be text, graphics, or both. Examples of logos include advertisements, an information box, a team emblem, or any other suitable graphic. A logo can be placed on an image of a playing field, a stadium, a stage, a player, an object of play (e.g. a ball or puck), a basketball backboard, between the field goal uprights, in the stands, on the fans, etc.

In some embodiments, the blending of a graphic must account for occlusions. That is, if a person steps on top of or in front of an area where the graphic is added, the graphic should not be drawn on top of the person. Rather, the person should appear to be stepping on or standing in front of the graphic.

There are many examples of systems known in the art for enhancing the video of a live event. U.S. patent application Ser. No. 09/160,534, filed Sep. 24, 1998, System For Enhancing a Video Presentation of a Live Event, incorporated herein by reference, discloses a system for adding a first down line to a video presentation of a football game or other sporting event, and adding advertisements or other logos to a video presentation of a live event. U.S. patent application Ser. No. 08/585,145, filed Jan. 10, 1996, A System For Enhancing the Television Presentation of an Object at a Sporting Event, incorporated herein by reference, discloses a system that determines the position of an object's image in a video and enhances that object's image. U.S. Pat. No. 5,862,517 discloses a related system and is incorporated herein by reference. U.S. patent application Ser. No. 09/041,238, filed Mar. 11, 1998, System For Determining The Position Of An Object, incorporated herein by reference, discloses a system for determining the vertical position of an object at an event and adds a graphic to the video indicating that vertical position. U.S. patent application Ser. No. 08/735,020, A Method And Apparatus For Enhancing The Broadcast of a Live Event, filed Oct. 22, 1996, incorporated herein by reference, discloses a system for adding lines, advertisements and other graphics to video. Additionally, other systems are known in the art that add graphics to live presentations of sporting events, including virtual advertisements and other graphics.

All of the systems noted in the above paragraph, and other systems not listed, can be used to add graphics to an existing video. Typical of these systems is that all of the components necessary to perform the insertion or blending of the graphic into the video are located at the event (e.g. at the stadium). The present invention improves on these prior art systems by dividing the system up into at least two sets of components. A minimal set of components are transported to the actual event. A second set of components are operated at a location remote from the event such as a central studio which can be used with multiple events. By stating that equipment is at the event it is meant that the equipment is located at the site that the event is taking place. For example, if the event is a football game the equipment can be located on the field, in the stadium, in the parking lot, etc. The point is that the equipment is local to the event. On the other hand, being remote from the event can mean a different part of town, in a different city, different state, etc. A production truck in the parking lot of a football stadium is said to be at the event while a studio in another part of the state is remote from the event.

Figure 1:
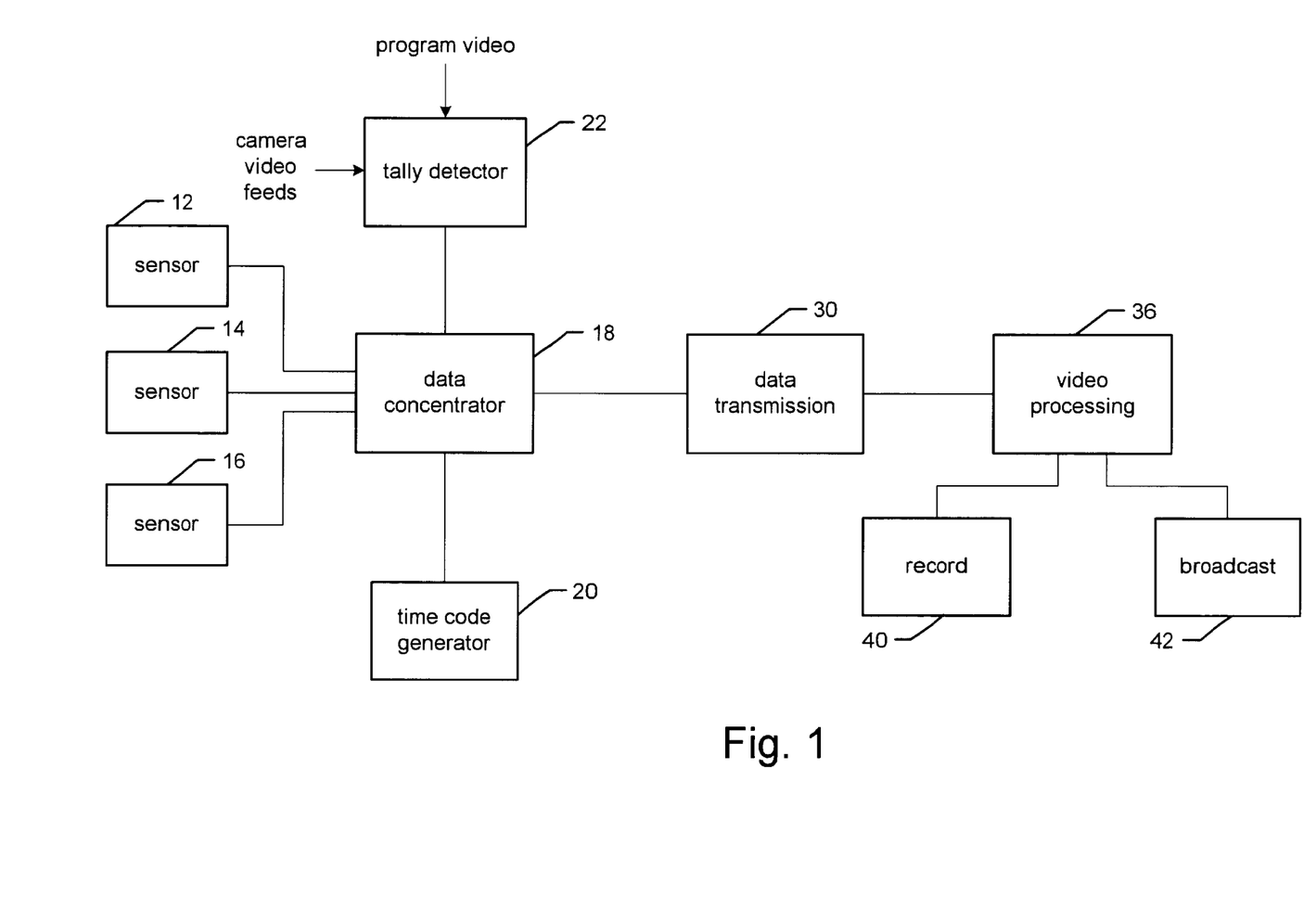
FIG. 1 is a block diagram of one configuration of the present invention.

FIG. 1 is a block diagram of one embodiment of the present invention. The system of FIG. 1 shows three sensors: sensor 12, sensor 14 and sensor 16. Three sensors are depicted for example purposes only. It is also possible to practice the invention with only one sensor, two sensors or more than three sensors. The sensors are located at the event and gather data which is used to enhance the video. In one embodiment the sensors are used to acquire position data, which is data related to the position or orientation of a camera and/or other object at the event. In one alternative, the sensors can be camera view sensors. In other alternatives, the sensors could be infrared sensors, video sensors, motion sensors, CCD's, audio sensors, light sensors or other sensors that gather data and are suitable for the particular application.

As stated above, one example of an appropriate sensor is a camera view sensor. A camera view sensor is a sensor that detects data about the camera view of a particular camera. Examples of camera view sensors include a zoom sensor, a pan sensor, a tilt sensor, roll sensors, inclinometer, angle rate sensor, a 2X extender sensor, lens focus sensor, or any combination of the above. In one embodiment, a zoom sensor may be a voltage output from the camera lens which indicates the state of the zoom lens. Similarly, a 2X extender may also include an output which indicates which mode the extender is in and a lens may include an output indicating the state of its focus. Typically, broadcast cameras are mounted upon a pan/tilt head that enables the camera to pan and tilt. Attached to the pan and tilt head can be a pan sensor and/or a tilt sensor. In one embodiment, the pan/tilt head is part of the camera. In another embodiment, the pan/tilt head is separate from the camera. One embodiment uses separate pan and tilt heads.

In one embodiment, the pan sensor and the tilt sensor are optical encoders that output a signal measured as a number of counts (or pulses), indicating the rotation of a shaft. Forty thousand (40,000) counts may represent a full 360° rotation. Thus, a processor can divide the number of measured counts by 40,000 and multiply by 360 to determine the pan or tilt angle in degrees. The pan and tilt sensors use technology known in the art and can be replaced or augmented by other suitable pan and tilt sensors known by those skilled in the relevant art. In some embodiments, a local computer will be used with each set of sensors. Analog to digital converters can be used to convert analog signals from the sensors to digital signals to be used by the local computers.

The output of sensors 12, 14 and 16 are communicated to data concentrator 18. In one embodiment, a data concentrator is a device that accepts data from multiple devices, formats the data and sends the data to another device. In one alternative, data concentrator 18 can be a computer which accepts data from multiple sensors and combines them into one or more signals for transmission to other computers or other devices.

Data concentrator 18 also receives a signal from time code generator 20. Because there may be different delays due to processing the data or blending a graphic, and because the data may be stored for future post processing, it is necessary in some embodiments to associate time codes with the data and the video. In some embodiments, time codes are added to the video before data concentrator 18. Time code generator 20 sends the time codes to data concentrator 18. Data concentrator 18 would associate the time codes with data from the sensors. In alternative embodiments, the time codes can be associated with the appropriate data by other devices. The time code is also associated with the video. In one embodiment, the time code is written into the video signal for each frame (or field) of a video. One method for adding the time code to the video is to add it to the vertical blanking interval of the video signal.

If the sensors are detecting data from multiple cameras, it may be important to know which camera is being used for broadcast so the appropriate data can be used to do the enhancements. In one embodiment, a production truck associated with the broadcaster of an event will produce a signal indicating which camera has been tallied for broadcast. In another embodiment, each broadcast camera will have a tally switch which can be monitored. In yet another embodiment, the system of FIG. 1 can include a tally detector 22 which automatically determines which of a set of cameras are tallied for broadcast. Tally detector 22 would send an indication of which camera is tallied to data concentrator 18.

In the arrangement shown in FIG. 1, sensor 12, sensor 14, sensor 16, data concentrator 18, time code generator 20 and tally detector 22 are located at the event. For example, the sensors may be located at various camera locations in a stadium. Data concentrator 18, time code generator 20 and tally detector 22 may be located at a production truck in the parking lot of the stadium.

Data concentrator 18 sends its output to a studio that is remote from the event via data transmission 30. Data transmission 30 can be one of any number of alternatives for transmitting data from the event to the studio. One example is to have modems at the event and modems at the studio, and to transfer the data over one or more standard telephone lines. The data could also be transferred over ISDN lines, DSL lines, T1 lines, cable modems or other high speed communication lines. Additionally, a dedicated WAN can be used, a fiber optic connection can be used or a satellite can be used. Another alternative is to combine the data from data concentrator 18 with the program video signal. If the program video signal is a traditional NTSC signal, then the data from data concentrator 18 can be added to the vertical blanking interval of the video signal. The data can also be added to the video signal itself. Other examples of adding the data to the video signal include encoding the data into an audio subcarrier or encoding the data into the video signal during horizontal retrace. As new video data formats are introduced, the data could be added to those new video formats as appropriate. The data could also be transferred via an RF signal, a microwave signal or any other means for communicating that are suitable.

The studio will typically include a video processing system 36, a recording system 40 and a broadcast (or distribution) system 42. The video processing system 36 can include one or more processors, and other video equipment, that is used to enhance the video based on the data received from the sensors. Recording system 40 can be used to record the video after or before enhancement. Recording system 40 can include video tapes, DVD, laser disk, or both and other suitable media for recording. Broadcast system 42 is used to broadcast or distribute the enhanced video over traditional airwaves, cable tv, satellite transmission, closed circuit television, etc.

The present invention separates the video processing equipment (located at the studio) from the data gathering equipment (located at the event). Any of the systems described above (including those incorporated by reference) can be adapted the configuration of FIG. 1. More details about many of the individual components can be found in those applications incorporated by reference.

Figure 2:
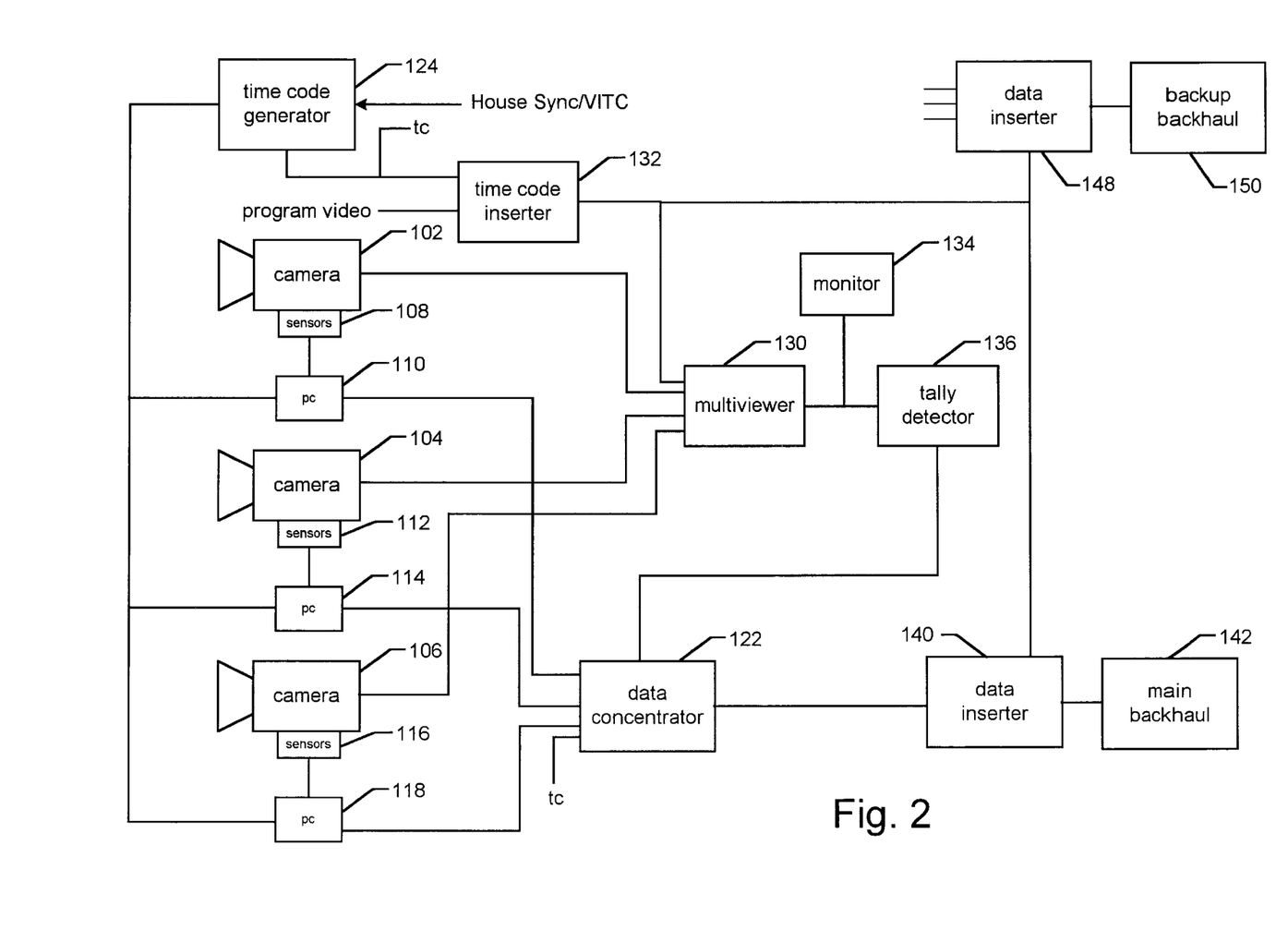
FIGS. 2 and 3 are more detailed block diagrams of a second configuration of the present invention.
Figure 3:
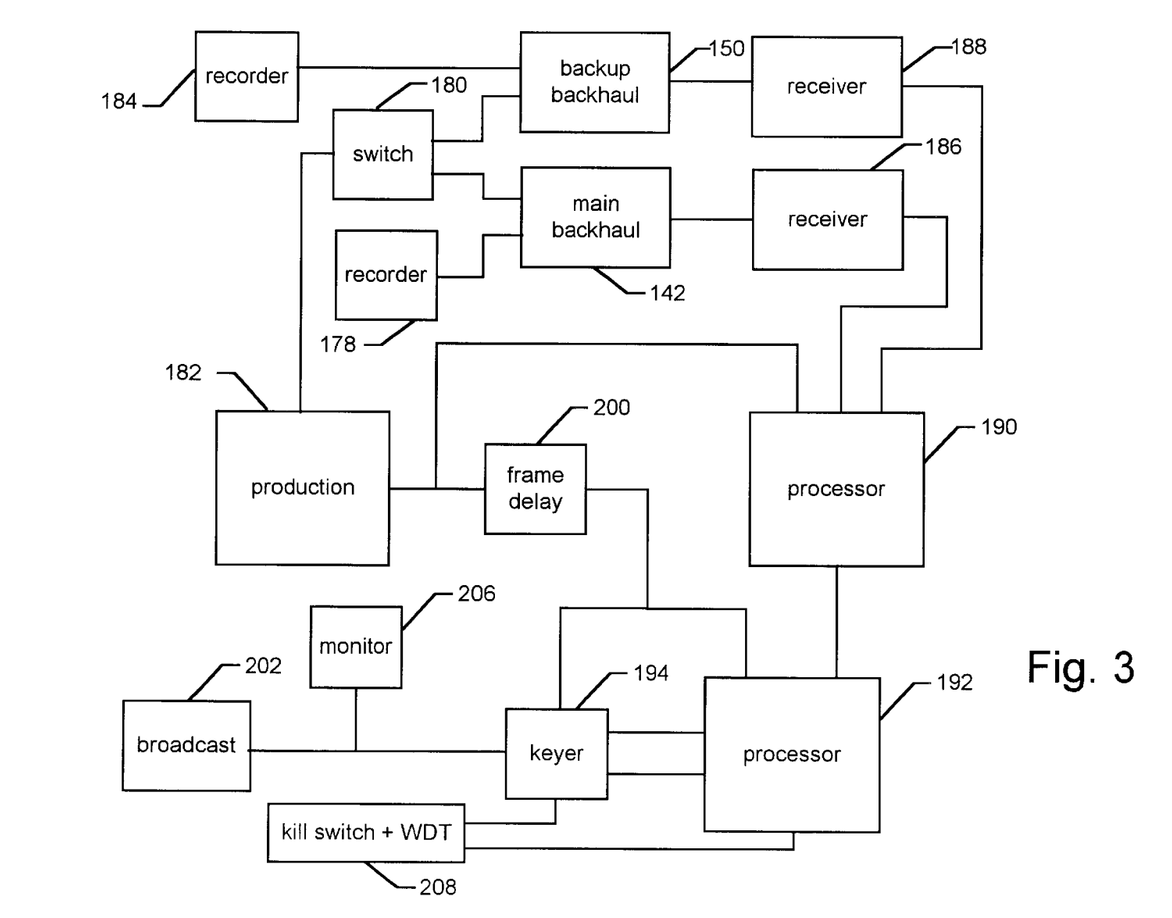

FIGS. 2 and 3 are block diagrams of a second configuration of the present invention. The components of FIG. 2 are located at the event and the components of FIG. 3 are located at the studio. In alternative embodiments, some of the components from FIG. 2 can be located at the studio and some of the components from FIG. 3 can be located at the event. In various embodiments, some components may also be omitted. The system of FIGS. 2 and 3 can be used to enhance a video representation of a football game. It can also be used with other sporting events or nonsporting events. On exemplar enhancement that can be accomplished with the system of FIGS. 2 and 3 is to blend a graphic with the video. Suitable graphics include a first down line, advertisements highlighting current, previous or future locations of balls, pucks, players, cars or other moving or still objects. In many respects, the system of FIGS. 2 and 3 is an adaptation, according to the present invention, of the system disclosed in U.S. patent application Ser. No. 09/160,534, System For Enhancing a Video Presentation of a Live Event, which is incorporated by reference. The system of FIG. 2 includes three video cameras, 102, 104 and 106. Although three cameras are disclosed, the system can be used with more or fewer than three cameras. For example, in one embodiment, the system only includes one camera. Each camera is associated with a set of one or more camera view sensors. For example, camera 102 includes camera view sensor(s) 108, camera 104 includes camera view sensor(s) 112 and camera 106 includes camera view sensor(s) 116.

Connected to each camera may be a 2X extender, a zoom lens and a means for focusing the camera. The set of camera view sensors can include one or more of the following, a sensor for detecting pan, a sensor for detecting tilt, a sensor for detecting a roll, a sensor for detecting the amount of zoom, a sensor for detecting the focus and a sensor for detecting the state of the 2X extender.

Each camera is associated with a local computer. For example, camera 102 is associated with computer 110, camera 104 is associated with computer 114 and camera 106 is associated with computer 118. The local computers can be a 486 processor based machine, a Pentium processor based machine, a Macintosh platform, a dedicated micro controller or another type of computer/processor. Data from each of the sets of sensors 108, 112 and 116 are sent to the respective local computers 110, 114 and 118. It may be necessary to use analog to digital converters if the data from the sensors is analog in nature. In some embodiments, the zoom sensor is merely a wire from the zoom lens to an analog to digital converter. Each of the computers 110, 112 and 118 communicate the data from the sensors to data concentrator 122. In one embodiment, data concentrator 122 is a computer. With any of the devices shown in FIGS. 2 and 3, it may be necessary to use converters between RS-422 and RS-232 or other formats. One embodiment includes not using a concentrator and having dedicated lines for each sensor. The information sent by local computers 110, 114 and 1 18 include pan, tilt, zoom, focus and 2X extender data measured for cameras 102, 104 and 106. Data concentrator 122 may also receive a signal from tally detector 136. In one embodiment, all the signals received by concentrator 122 are formatted, combined into one serial signal and sent to data inserter 140. One embodiment includes multiple data inserters, e.g. one per camera. In another alternative, the signals from the local computer can be transmitted via the microphone channel of the video signal from the camera. In another embodiment, data concentrator 122 can combine the signals into a format suitable for parallel port transmission, Ethernet transmission or other communication means different than the serial signal.

The video outputs of cameras 102, 104 and 106 are sent to multiviewer 130. In addition, the video outputs are also sent to a production truck used to produce the video presentation of the event. The production truck may receive signals from many different video cameras. The producer chooses which video signal(s) to broadcast. The video signal(s) chosen to be broadcast (and, perhaps, graphics added to that video) is called the "program video."

The program video is communicated to multiviewer 130. In one embodiment, the cameras output an analog signal. In another embodiment, the cameras output a digital video signal. In another embodiment, the cameras output analog signals which are converted to digital signals. The system can work with analog signals or digital signals, as long as the appropriate multiviewer is chosen. For example, a multiviewer that can accept digital inputs includes the video Gainsville CVX 64Q. An example of a multiviewer that can accept analog inputs includes the Panasonic WJ-420 quad unit or FOR-A MB-40E. Using digital signals may improve the performance of tally detector 136. Multiviewer 130 combines input video signals into one signal which is sent to tally detector 136 and monitor 134. A suitable multiviewer can be used with less than four or more than four signals. Alternatively, if the tally detector can receive more than one input, there may not be a need for multiviewer. Monitor 134 (optional) is used by an operator to monitor the video signals being sent to tally detector 136.

Tally detector 136 determines which (if any) of the three cameras 102, 104 or 106 is tallied. A camera is said to be tallied if it is the primary source of the video chosen by the producer to be broadcast. With respect to the system of FIG. 1, a camera is tallied if it is the primary source of the video being sent as the program video. Tally detector 136 sends to data concentrator 122 an indication of which, if any, of the three cameras is tallied. In a system which has only one camera, there is no need for a tally detector. In a system that has more than three cameras, the tally detector can be designed to determine which of the many cameras is tallied.

The system also receives a house time code or House Sync (House Sync/VITC) used by the broadcaster. Time code generator 124 accepts the House Sync/VITC signal, interprets the signal and sends the signal to time code inserter 132. Time code inserter 132 inserts time codes into the program video and sends the program video (with time code) to multiviewer 130, data inserter 140 and data inserter 148. The time code inserted into the program video is used to match the camera view data with the correct frame or field of video. In one alternative, the output (tc) of time code generator 124 is transmitted to data concentrator 122, which associates the time code with data from the sensors. One example of associating the time code with data is creating a data structure which includes a field to store the time code and add fields to store the data.

Data concentrator 122 sends the camera view data, target data and tally indication to data inserter 140. Data inserter 140 is a standard encoder for inserting data into the vertical blanking interval of a video signal. An example of a data inserter includes the TES3 Multistandard TV Data Encoding Platform from Norpak Corporation of Kanata, Ontario. Data inserter 140 receives a video signal from time code inserter 132 and data from data concentrator 122. Data inserter inserts the data from data concentrator 122 into the vertical blanking interval of the video signal from time code inserter 132. In one embodiment, all of the camera view data is transmitted on one line. In other embodiments, the camera view data for each camera is transmitted on a separate line. The tally indication can be transmitted on the same line as the camera view data or on a different line.

Some systems will need to be registered. The registration process will be discussed in more detail below. In one embodiment, data concentrator 122 will store the registration information. Data concentrator 122 can continuously transmit the registration data to data inserter 140 such that the registration information is transmitted on every vertical blanking interval or once every n frames. In one embodiment, each vertical blanking interval will include a subset of the registration information.

After data inserter 140 inserts the camera view data, tally indication and registration information into the video signal, the video signal is sent to the studio via main backhaul 142. In one embodiment, data inserter 140 also inserts the time codes into the vertical blanking interval of the video signal.

The main backhaul is the primary means for transferring the video from the event to the studio. In one embodiment, a dedicated fiber optic line is used to transmit the video signal for the main backhaul. In an alternative embodiment, satellite transmission can be used. In other embodiments, other means for communicating video can be used. Main backhaul 142 is a standard communication channel known in the broadcast television industry.

The system also includes a back up backhaul 150, which is also a standard known in the television industry. Typically, back up backhaul 150 will also transmit the same video signal as main backhaul 142. Back up backhaul 150 is used in case main backhaul 142 fails. Back up backhaul can transmit video by any of the means described for the main backhaul. The system of FIG. 2 also includes a second data inserter 148. Data inserter 148 can insert the camera view data, other target data, registration data, tally indication and/or time codes into the video signal for backhaul 150. In an alternative embodiment, data inserter 148 can be used to insert all or some of the video signals not tallied into back up backhaul data stream. In one embodiment, each of the video signals not tallied can be telemetered via the back up backhaul data stream by using known compression techniques which reduce the quality and/or resolution of the video. In one embodiment, it is acceptable if the video signals being telemetered via the back up backhaul are lower in quality because these signals will only be used for reference purposes.

FIG. 3 shows the components of the second configuration which are typically located at the studio. The signal from main backhaul 142 is communicated to recorder 178 so that the signal can be used for post processing after the event is over. Additionally, the signal from back up backhaul 150 is sent to recorder 184 for post-processing, or other purposes. The signals for main backhaul 142 and back up backhaul 150 are sent to a switch 180, which chooses one of the two signals to communicate to production equipment 182. Production equipment 182 includes video processing equipment for adding effects to the video such as statistics (e.g. out of town scores, time remaining), broadcaster logos and other graphics used by the producer of the event. The effects added by production equipment 182 are not necessarily part of the present invention; however, they can be in some embodiments. Switch 180 will typically select the main backhaul so that the video signal on the main backhaul will be used for broadcast. The signal from the main backhaul is also sent to receiver 186. The signal received from back up backhaul 150 is sent to receiver 188. Receivers 186 and 188 are standard receivers known in the art for reading data from the vertical blanking interval of a video signal. Examples of receivers known in the art include the TTX74X PC Peripheral TV Data Broadcast Receiver and the TTX64X+External Box VBI Data Broadcast Receiver, both from Norpak Corporation. Receiver 186 and receiver 188 read the data from the vertical blanking interval and send that data to processor 190. Production equipment 182 also sends its output video signal to processor 190. In one embodiment, there is no need for production equipment 182 and the video signal sent from switch 180 is communicated directly to processor 190 and frame delay 200.

In one embodiment, the operator of the system of FIG. 3 uses processor 190 to select a target area at the event to enhance. Using a model of the event, processor 190 determines the screen coordinates of the selected target area. Using the camera view data received from local computers 110, 112 and 118, processor 190 determines the position of the selected target area in the video from the camera that is tallied. That information can be used to blend a graphic with the video signal at a determined position. Processor 190 and processor 192 work together to create the graphic and an alpha signal. Both the graphic and the alpha signal are sent to keyer 194.

An alpha signal that is sent to keyer 194 is also called a key signal. Each pixel in a field or frame of video may have its own key or alpha value. The graphic signal can be sent as a YUV signal, RGB signal or YCbCr signal or other appropriate signal according to the specifications of the keyer. Keyer 194 also receives a video signal from frame delay 200. Frame delay 200 receives a video signal from either production equipment 182 or directly from switch 180 (not shown in FIG. 3). Frame delay 200 delays the video signal to account for the processing time of processors 190 and 192. In one alternative, a computer can be used to blend the graphic instead of using a keyer. For example, either processor 190 or 192 can be used, or an additional computer can be used. In some embodiments, the functions of processors 190 or 192 can be combined into one computer.

The graphics sent from processor 192 to keyer 194 is called foreground and the signal from frame delay 200 to keyer 194 is called background. Based on the level of the alpha or key from processor 192, keyer 194 determines how much foreground and background to blend on a pixel by pixel basis. Keyer 194 can blend from 100% foreground and 0% background, to 0% foreground and 100% background. In one embodiment, the key or alpha for a pixel can range from 0%–100% (or 0–1 or another range as per the specification of the keyer). The output of keyer 194 is sent to broadcast equipment 202 for broadcast. The output of keyer 194 is also sent to a monitor 206 for viewing by the operator of the system. Additionally, the output of keyer 194 can be recorded.

Kill switch/watch dog timer 208, which is in communication with processor 192 and keyer 194, can be used by an operator to enable or disable the keying of the graphic. In one embodiment, processor 192 sends a pulse for each frame, field or other interval. The watch dog timer will disable the keying if it does not receive the pulses after a predetermined amount of time, frames or fields.

In one embodiment, processor 190 and tally detector 136 are O2 workstations from Silicon Graphics and processor 192 is an Indigo 2 Impact from Silicon Graphics. In other embodiments, other suitable computers can be used. It is noted that these computers typically include processors, memory, disk drives, monitors, input devices, output devices, network interfaces, etc. In one embodiment, an Ethernet can be set up between processor 190 and 192. The Ethernet is used for maintenance purposes and communication between the processors.

Figure 4:
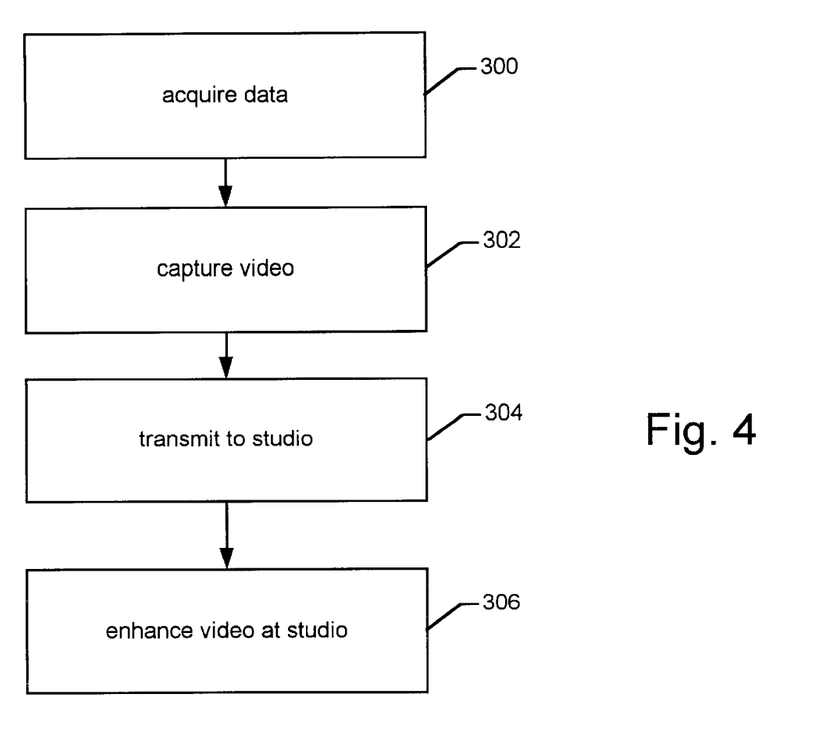
FIG. 4 is a flow chart describing the operation of one embodiment of the present invention.

FIG. 4 is a flow chart which describes the operation of one embodiment in the present invention. In step 300, the system acquires data. Looking at the embodiment of FIG. 1, step 300 could include sensors 12, 14 and 16 acquiring appropriate data. Looking at FIG. 2, step 300 could include groups of sensors 108, 112 and 116 acquiring camera view data. In step 302, the system captures video. For example, cameras 102, 104 and 106 of FIG. 2 can be used to capture video of the event. Steps 300 and 302 can be performed in parallel. In step 304, the system transmits relevant information from the event to the studio. The transmitted information includes the data acquired in step 300 and the video captured in step 302. In step 306, the video transmitted to the studio is enhanced using the data acquired in step 300. Steps 300 and 302 are typically performed at the event and step 306 is performed at the studio, which is remote from the event. In other embodiments, steps 300 and 302 can be performed in alternative locations as technology allows.

Figure 5:
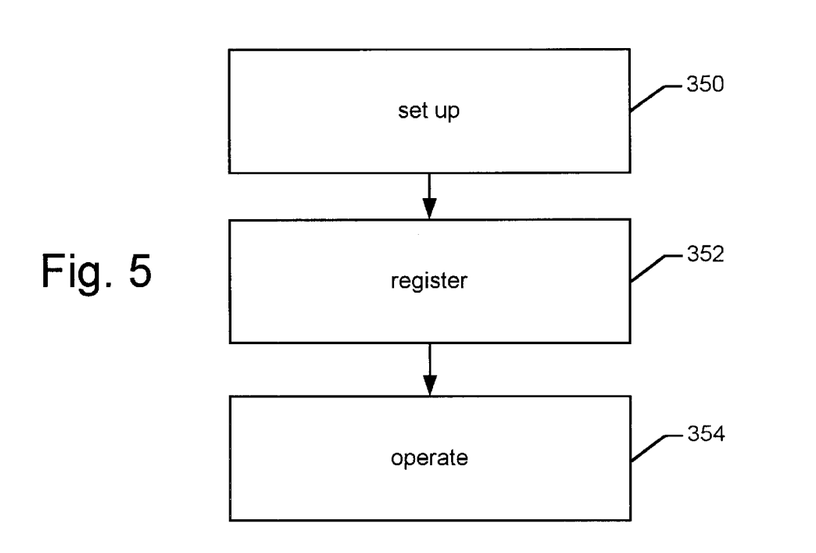
FIGS. 5–7 are flow charts describing the operation of various alternative embodiments of the present invention.

FIG. 5 is a flow chart explaining the operation of one embodiment of the present invention. In step 350, the system is set up for operation. Setting up the system may include defining information needed for the operation during the event. For example, if the system is being used to add virtual advertisements to the video, the operator may need to identify which locations in the stadium will be used for the virtual advertisements and what advertisements to add. Some systems allow for the inclusion or exclusions of certain colors. This information can also be set up during step 350. Other user defined variables such as graphic color, sizing and various parameters can be set up in step 350.

In step 352, the system is registered. Registration is the process of defining how to interpret data from a sensor (a camera being one type of sensor, a camera view sensor being another type of sensor). The sensors described above output data, for example, related to position. Since position is relative, the system needs a reference from which to determine position or location. Thus, in order to be able to use positional data, the system needs to know how to interpret the positional data to make use of the information. For example, a coordinate system needs to be set up, the locations of each of the sensors need to be noted and the sensors need to be calibrated so the data can be interpreted in light of the coordinate system. The registration process is different for each system and so the process needs to be tailored to the individual sensors. Many of the references noted above describe registration processes.

Figure 6:
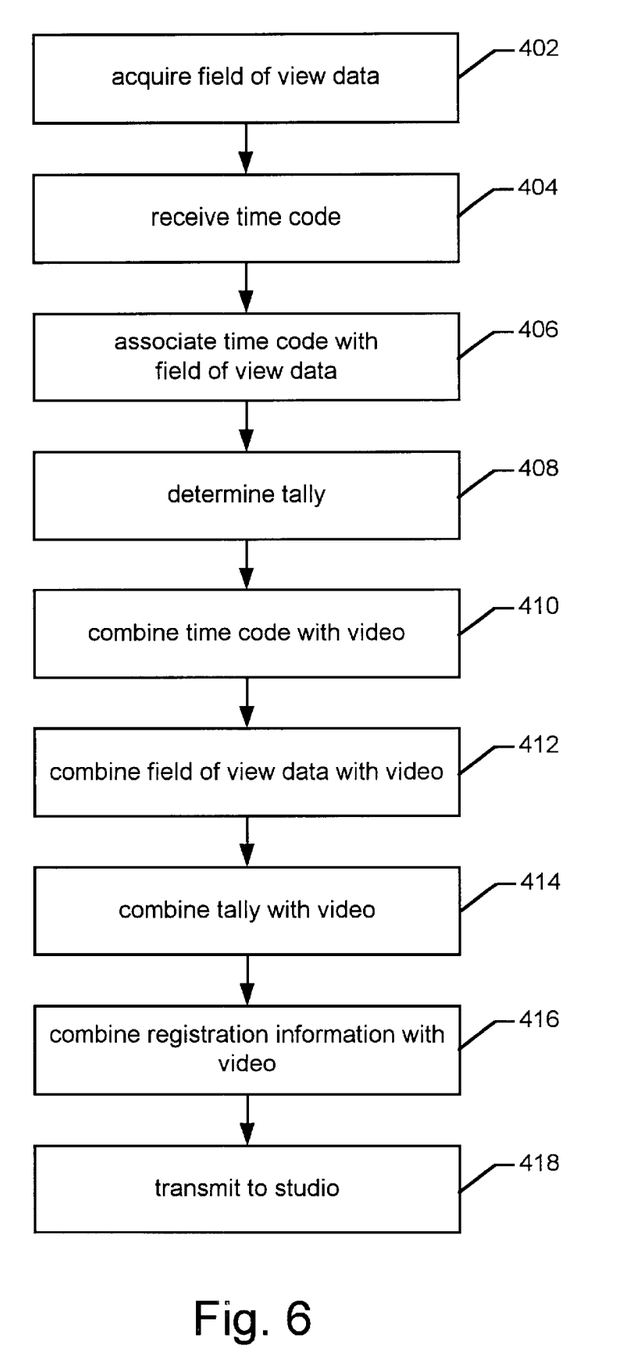
Figure 7:
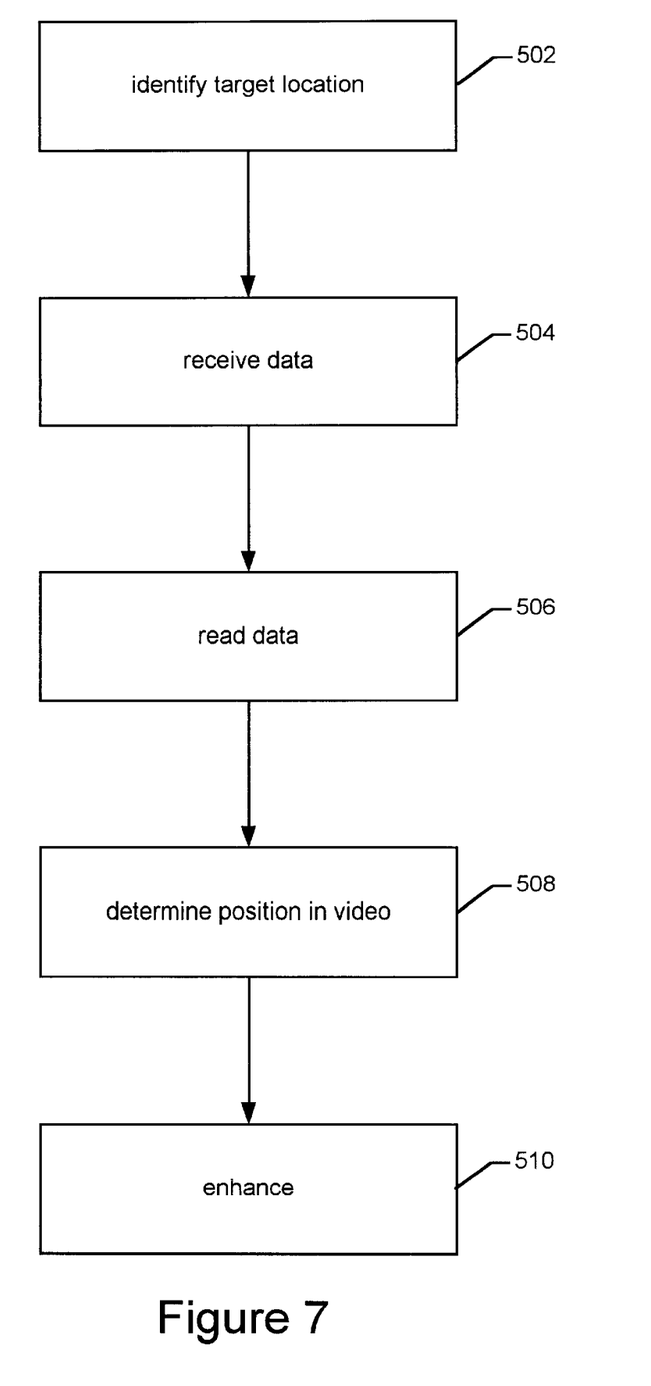

In step 354, the system is operated during the event. Step 354 can include the steps of FIG. 4, FIG. 6 and/or FIG. 7, as well as methods for operating other systems within the spirit of the present invention FIGS. 6 and 7 are flow charts which explain the operation of another embodiment of the present invention. The method of FIGS. 6 and 7 can be used with the system of FIG. 1 or the system of FIGS. 2 and 3. In one embodiment, the steps of FIG. 6 are performed at the event and the steps of FIG. 7 are performed at the studio, remote from the event. In step 402, sensors 108, 112 and 116 are used to acquire camera view data. In step 404, the system receives a time code. Typically the time code is received from the broadcast production truck. In step 406, the time code is associated with the appropriate camera view data. For example, data concentrator 122 will associate a time code received from time code generator 124 with the appropriate camera view data. Alternatively, the time code is added to the program video by time code inserter 132, and data inserter 140 inserts the appropriate camera view data in the same vertical blanking interval as the appropriate time code. In step 408, the system determines which camera is tallied. In step 410, the system combines the time code with the video. For example, in FIG. 2, time code inserter 132 inserts the time code into the program video. The time code can be inserted into the vertical blanking interval of the program video or can be inserted into another portion of the program video. In step 412, the system combines the camera view data with the video. In step 414, the system combines the tally indication with the video. In step 416, the system combines the registration information with the video. Looking at FIG. 2, data inserter 140 can be used to perform steps 412, 414 and 416. In one embodiment, steps 412, 414 and 416 are performed simultaneously. In step 418, the video, camera view data, time code, tally indication and registration information are transmitted over the main backhaul and/or back up backhaul as discussed above.

FIG. 7 describes the steps of one embodiment that are performed at the studio. In step 502, the location of the target area to be enhanced is identified. There are many alternatives for performing step 502. For example, sensors can be used to determine the three dimensional location of an object that is moving at an event. Such systems of sensors are known in the art and are described in U.S. patent application Ser. Nos. 08/585,145, 08/786,108 and 09/041,238, all of which are cited above. Alternatively, U.S. patent application Ser. No. 09/160,534 describes a system in which the operator manually types in an indication of a three dimensional location at the event. Other systems can also be used to determine the location of the target area to be enhanced. In one embodiment, step 502 is not performed as part of the present invention.

The steps of FIG. 6 and FIG. 7 are continuously performed throughout the event. In one embodiment, the steps of FIG. 6 and FIG. 7 are performed on a field by field basis, a frame by frame basis or some other period.

In step 504, the studio receives the data and video transmitted in step 418. In step 506, data is read, decoded or otherwise separated from the video, if necessary. For example, step 506 could include using receiver 186 to access the data in the vertical blanking interval of a video signal. Step 508 includes determining the position of the target area in the video. Different systems for enhancing a video have different methods for determining the position of the target area in the video. Each of the systems cited above have various means for determining the position in the video. Any of those means for determining the position can be used with respect to step 508. For example, many of the prior art systems use a matrix to convert a three dimensional location to a two dimensional position in the video. In step 510, the video is enhanced. In one embodiment, a graphic is blended with the target area of the video. In another embodiment, a graphic can be blended with the video at a location adjacent to or logically near the target area determined in step 508.

In another embodiment, rather than determine the position within the video and enhance the video during the live event, the video and all the data is recorded by recorder 178 (and, optionally recorder 184) using a video tape, or other medium. The components of FIG. 3 can be used to perform the steps of FIG. 7 subsequent to the end of the event in order to post process the video tape. By recording all of the camera view data, time codes and registration information, the system of FIG. 3 can easily post process the data.

Additionally, because the equipment depicted in FIG. 3 is located at a studio remote from the event, immediately following the end of the event the equipment of FIG. 3 can be used for another event. The equipment does not need to be transported before subsequent use and the broadcaster need not purchase an expensive truck to transport the equipment. In one alternative, the processors depicted in FIG. 3 can be large main frames or super computers so that more than one event can be processed at the same time. It is also contemplated that a studio complex can have multiple studios within the complex for simultaneously processing/broadcasting many events. Each studio can contain the components of FIG. 3 so that multiple events can be processed and broadcast at the same time.

In one embodiment, the systems described herein operate in real time to enhance live video. Live video can be delayed a small amount of time and still be considered live. For example, a live television broadcast can be delayed one third to one half of a second and still be considered live. Other small delays are also acceptable. However, the frame delay should be constant. That is, if the video processing requires a fifteen frame delay, then each frame for broadcast should be delayed no more than fifteen frames. The delay cannot grow as the event progresses.

In one embodiment, data transmitted from the site of the event to the studio could include the three dimensional location of one or more targets. Examples of targets include pucks, balls, players, cars, animals, field positions, lines or other markings on the field of play, locations of objects of interest, etc. This data can be sent to the studio and used to enhance video and/or audio. That is, the data concentrator can send the appropriate sensor data to a processor at the event. The processor can use the sensor data to determine the three dimensional location of a target. This three dimensional location can be transmitted to the studio and used by another computer to determine a two dimensional pixel location of the target's position on a frame or field of video.

The foregoing detailed description of the invention has been presented for purposes of illustration and description. It is not intended to be exhaustive or to limit the invention to the precise form disclosed, and obviously many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for enhancing a video presentation of a live event, comprising the steps of:
    receiving camera view data and first video during said live event, said camera view data and said first video are received at a location remote from said live event, said camera view data and said first video are received from a video production facility for said first video, said video production facility is located at said live event, said camera view data pertains to a first camera, said first camera captures said first video;
    determining a position in said first video based on said received camera view data, said step of determining a position is performed at said location remote from said live event; and
    enhancing said first video based on said determined position in said first video, said step of enhancing is performed at said location remote from said live event, said step of enhancing is performed during said live event.

2. A method according to 1, further comprising the steps of:
    sensing said camera view data at said live event and during said live event;
    transmitting said camera view data, during said live event, to said video production facility; and
    transmitting said camera view data, during said live event, from said video production facility to said location remote from said live event.

3. A method according to claim 2, further comprising the steps of:
    sensing additional camera view data for additional cameras at said live event; and
    transmitting said additional camera view data to said video production facility.

4. A method according to claim 2, further comprising the step of:
    associating one or more time codes with said camera view data in order to synchronize said camera view data with said first video, said step of associating is performed at said video production facility, said step of receiving includes receiving said one or more time codes, said step of determining uses said time codes.

5. A method according to 1, further comprising the step of:
    receiving registration information multiple times from said live event, said registration information is received at said location remote from said live event, said registration information pertains to said camera view data, said step of determining uses said registration information to determine said position.

6. A method according to claim 1, wherein:
    said camera view data and said first video are received from said video production facility via a backhaul.

7. A method according to 1, further comprising the step of:
    receiving information pertaining to a three dimensional position of an object at said live event, said step of determining uses said information to determine said position.

8. A method according to 1, further comprising the steps of:
    sensing said camera view data at said live event and during said live event;
    transmitting said camera view data, during said live event, to said video production facility;
    transmitting said camera view data, during said live event, from said video production facility to said location remote from said live event;
    associating one or more time codes with said camera view data in order to synchronize said camera view data with said first video, said step of associating is performed at said video production facility, said step of receiving includes receiving said one or more time codes, said step of determining uses said time codes; and
    receiving registration information multiple times from said live event, said registration information is received at said location remote from said live event, said registration information pertains to said camera view data, said step of determining uses said registration information to determine said position.

9. An apparatus for enhancing a video presentation of a live event, comprising:
    a receiver at a location remote from said live event, said receiver is in communication with a video production facility at said live event in order to receive camera view data and first video from said video production facility during said live event, said camera view data pertains to a first camera, said first camera captures said first video; and
    a video processing apparatus at said location remote from said live event, said video processing apparatus is in communication with said receiver, said video processing apparatus determines a position in said first video based on said received camera view data, said video processing apparatus enhances said first video based on said determined position in said first video during said live event.

10. An apparatus according 9, wherein:
    said receiver receives registration information multiple times from said live event, said registration information pertains to said camera view data, said video processing apparatus uses said registration information to determine said position.

11. An apparatus according 9, wherein:
    said receiver receives said camera view data and first video via a backhaul.

12. An apparatus according to 9, wherein:
    said receiver receives information pertaining to a three dimensional position of an object at said live event, said video processing apparatus uses said information to determine said position.

13. A method for enhancing video presentations, comprising the steps of:
    receiving camera view data for multiple live events at a central location that is remote from said live events, said step of receiving is performed during said live events;
    determining positions in videos of said live events based on said received camera view data, said step of determining positions is performed at said central location; and
    enhancing said videos based on said determined positions, said step of enhancing is performed at said central location, said step of enhancing is performed during said live events.

14. A method according to claim 13, further comprising the steps of:
sensing said camera view data at said live events, said camera view data pertains to cameras at said live events that capture said videos of said live events; and
transmitting said camera view data to said central location.

15. A method according to claim 14, further comprising the steps of:
associating time codes with said camera view data in order to synchronize said camera view data with said videos, said step of associating is performed at said live events, said step of receiving includes receiving said time codes, said step of determining uses said time codes.

16. A method according to claim 13, wherein:
said camera view data is received via backhauls from said live events.

17. A method according to claim 13, wherein:
said camera view data is received from video production facilities at said live events.

18. A method according to 13, further comprising the step of:
receiving registration information multiple times from said live events, said registration information is received at said central location, said registration information pertains to said camera view data, said step of determining uses said registration information to determine said positions.

19. A method according to claim 13, further comprising the step of:
receiving information at said central location from said live events, said information pertains to three dimensional locations of objects at said live events, said step of determining uses said information to determine said positions.

20. An apparatus for enhancing video presentations of live events, comprising:
a set of one or more receivers in communication with transmitters at said live events in order to receive camera view data for said live events during said live events, said one or more receivers are at a central location remote from said live events; and
one or more video processing units at said central location in communication with one or more of said receivers, said video processing units determine positions in videos of said live events based on said received camera view data, said video processing units enhance said videos based on said determined positions during said live event.

21. An apparatus according to claim 20, wherein:
said receivers are in communication with said transmitters via backhauls from said live events.

22. An apparatus according to claim 20, wherein:
said transmitters are located at video production facilities at said live events.

23. An apparatus according to claim 20, wherein:
said receivers receive registration information multiple times from said live events, said registration information pertains to said camera view data, said one or more video processing units use said registration information to determine said positions.

24. An apparatus according to claim 20, wherein:
said receivers receive information from said live events that pertains to three dimensional locations of objects at said live events, said one or more video processing units use said information to determine said positions.

25. A method for enhancing a video presentation of a live event, comprising the steps of:
receiving first camera view data during said live event from said live event, said first camera view data is received at a location remote from said live event, said first camera view data pertains to a first camera, said first camera captures first video of said live event;
receiving registration information multiple times from a first location at said live event, said registration information is received at said location remote from said live event, said registration information pertains to said first camera view data;
determining a position in said first video based on said received first camera view data and said registration information, said step of determining a position is performed at said location remote from said live event; and
enhancing said first video based on said determined position in said first video, said step of enhancing is performed at said location remote from said live event, said step of enhancing is performed during said live event.

26. A method according to claim 25, further comprising the steps of:
sensing said first camera view data at said live event and during said live event;
transmitting said first camera view data to said location remote from said live event; and
transmitting said registration information from said first location to said location remote from said live event.

27. A method according to claim 26, further comprising the steps of:
sensing additional camera view data for additional cameras at said live event;
transmitting said additional camera view data to a video production facility for said first video at said live event;
transmitting said first camera view data to said video production facility, said step of transmitting said first camera view data to said location remote from said live event includes transmitting said first camera view data from said video production facility, said video production facility is at said first location.

28. A method according to claim 27, further comprising the step of:
associating one or more time codes with said first camera view data in order to synchronize said first camera view data with said first video, said step of associating is performed at said first location, said step of receiving includes receiving said one or more time codes, said step of determining uses said time codes.

29. A method according to claim 28, wherein:
said first camera view data and said first video are transmitted to said location remote from said live event via a backhaul.

30. A method according to claim 25, wherein:
said step of receiving registration information multiple times includes periodically receiving said registration information.

31. A method for enhancing a video presentation of a live event, comprising the steps of:
sensing, during said live event, camera view data for multiple cameras at said live event, said multiple cameras capture video of said live event;

transmitting, during said live event, said camera view data for said multiple cameras to a first location at said live event;

transmitting, during said live event, at least a first subset of said camera view data from said first location to a second location, said second location is remote from said live event;

determining a position in a first video based on said transmitted camera view data, said step of determining a position is performed at said second location, said first video is from one of said multiple cameras; and enhancing said first video based on said position in said first video, said step of enhancing is performed at said second location, said step of enhancing is performed during said live event.

32. A method according to claim 31, wherein:

said first location is a video production facility for said first video.

33. A method according to claim 31, wherein:

said first subset of said camera view data is transmitted from said first location to said second location via a backhaul.

34. A method according to claim 31, further comprising the step of:

associating time codes with said camera view data in order to synchronize said camera view data with said video from said multiple camera, said step of associating is performed at said first location.

35. A method for enhancing a video presentation of a live event, comprising the steps of:

receiving video for a first camera, said video is received at a location remote from said live event, said video is received from said live event via a backhaul, said video depicts said live event, said video is received during said live event;

receiving camera view data at said location remote from said live event during said live event, said camera view data pertains to said first camera, said camera view data is transmitted with said video via said backhaul;

determining a position in said video based on said transmitted camera view data, said step of determining a position is performed at said location remote from said live event; and enhancing said video based on said determined position in said video, said step of enhancing is performed at said location remote from said live event, said step of enhancing is performed during said live event.

36. A method according to 35, further comprising the steps of:

sensing said camera view data at said live event; and transmitting said camera view data to said location remote from said live event via said backhaul.

37. A method according to claim 36, further comprising the step of:

associating time codes with said camera view data in order to synchronize said camera view data with said video, said step of associating is performed at a production facility for said video at said live event, said step of transmitting includes transmitting said camera view data from one or more camera view sensors to said production facility prior to said step of associating and transmitting said camera view data to said location remote from said live event via said backhaul after said step of associating.

* * * * *